(12) United States Patent
Jaramillo et al.

(10) Patent No.: US 8,725,514 B2
(45) Date of Patent: May 13, 2014

(54) VERIFYING A USER USING SPEAKER VERIFICATION AND A MULTIMODAL WEB-BASED INTERFACE

(75) Inventors: David Jaramillo, Lake Worth, FL (US); Garald Matthew McCobb, Delray Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 1346 days.

(21) Appl. No.: 11/062,731

(22) Filed: Feb. 22, 2005

(65) Prior Publication Data

US 2006/0190264 A1  Aug. 24, 2006

(51) Int. Cl.
*G10L 21/00*  (2013.01)

(52) U.S. Cl.
USPC ........................................ 704/270.1; 704/273

(58) Field of Classification Search
USPC .............................. 704/246, 270.1, 273, 274
See application file for complete search history.

(56) References Cited

U.S. PATENT DOCUMENTS

| | | | |
|---|---|---|---|
| 5,897,616 A * | 4/1999 | Kanevsky et al. | 704/246 |
| 5,915,001 A * | 6/1999 | Uppaluru | 379/88.22 |
| 6,073,101 A | 6/2000 | Maes | |
| 6,107,935 A | 8/2000 | Comerford et al. | |
| 6,219,639 B1 | 4/2001 | Bakis et al. | |
| 6,266,640 B1 * | 7/2001 | Fromm | 704/273 |
| 6,529,871 B1 * | 3/2003 | Kanevsky et al. | 704/246 |
| 6,754,628 B1 | 6/2004 | Chaudhari et al. | |
| 6,801,604 B2 | 10/2004 | Maes et al. | |
| 2002/0169608 A1 * | 11/2002 | Tamir et al. | 704/246 |
| 2003/0088421 A1 * | 5/2003 | Maes et al. | 704/270.1 |
| 2003/0163739 A1 * | 8/2003 | Armington et al. | 713/202 |
| 2004/0177097 A1 * | 9/2004 | Yu et al. | 707/104.1 |
| 2004/0186724 A1 | 9/2004 | Morin | |
| 2006/0101146 A1 * | 5/2006 | Wang | 709/227 |

FOREIGN PATENT DOCUMENTS

| | | |
|---|---|---|
| EP | 1255194 A2 | 6/2002 |
| WO | WO 99/54868 | 10/1999 |
| WO | 01/82190 A1 | 11/2001 |

OTHER PUBLICATIONS

Zhang, et al. "Automatic Speechreading with Applications to Human-computer Interfaces". Eurasip Jnl on Applied Signal Processing, vol. 2002, No. 11, Nov. 2002.

(Continued)

*Primary Examiner* — Angela A Armstrong
(74) *Attorney, Agent, or Firm* — Wolf, Greenfield & Sacks, P.C.

(57) ABSTRACT

A method of verifying a user identity using a Web-based multimodal interface can include sending, to a remote client device, a multimodal markup language document that, when rendered by the remote client device, queries a user for a user identifier and causes audio of the user's voice to be sent to a multimodal, Web-based application. The user identifier and the audio can be received at about a same time from the client device. The audio can be compared with a voice print associated with the user identifier. The user at the remote client device can be selectively granted access to the system according to a result obtained from the comparing step.

22 Claims, 3 Drawing Sheets

(56) References Cited

OTHER PUBLICATIONS

Broun, et al. "Multimodal fusion of polynomial classifiers for automatic person recognition". Proceedings of the SPIE—The Int'l Society for Optical Engineering, vol. 4390, pp. 166-174.

Lee, et al. "A Method on Improving and Enrolling Speed for the MLP-Based Speaker Verification System through reducing Learning Data". PRICAI 2002: Trends in Artificial Intelligence. 7th Pacific Rim Int'l Conf. on Artifical Intelligence. Proceedings (Lecture Notes in Artificual Intelligence) vol. 2417, pp. 619, Published: Berlin, Germany, 2002.

Xiang, et al. "Efficient Text-Independent Speaker Verification with Structural Gaussian Mixture Models and Neural Network". IEEE Transactions on Speech and Audio Processing, vol. 11, No. 5, Sep. 2003.

Bellegarda, et al. "Language-Independent, Short-Enrollment Voice Verification Over a far-field Micorphone". Spoken Language Group, Apple Computer, Inc., Cupertino, CA, 2001.

Georgescu, S. "Multimodal Access Enabler Based on Adaptive Keyword Spotting" M. Freire et al. (Eds.): ECUMN 2004, LNCS 3262, pp. 349-357, 2004.

Dahl, D. "Technical Standards Facilitate Innovation" Speech Technology, Jul. 8, 2004.

Chou, W. et al. "EMMA: Extensible MultiModal Annotation markup language" W3C Working Draft, Sep. 1, 2004.

Official Action from European Patent Application No. 06707758.6 issued Dec. 7, 2010.

Chou et al. EMMA: Extensible MultiModal Annotation markup language. W3C Working Draft, Dec. 14, 2004.

* cited by examiner

VERIFYING A USER USING SPEAKER VERIFICATION AND A MULTIMODAL WEB-BASED INTERFACE

BACKGROUND

1. Field of the Invention

The present invention relates to verifying a user identity using a multimodal Web-based interface.

2. Description of the Related Art

A multimodal interface allows a user to communicate with an application or other system through visual and verbal means. For example, a user can communicate through a graphical user interface (GUI), by issuing one or more spoken utterances, or by providing a combination of GUI input and voice input. Multimodal interactions can provide users with a more intuitive means for communicating with a system.

With respect to portable computing devices such as smart phones, personal digital assistants, and other devices having small form factors, multimodal interfaces allow users to select a means of interaction based upon circumstance. In some cases, it may be beneficial to utilize a GUI, while voice data input may be more advantageous or convenient in other cases. Under normal circumstances, for example, a user may opt for voice interaction because it is intuitive and fast. Voice data input further relieves the user from having to utilize a miniature keypad or small GUI, either of which can be cumbersome and tedious to use.

In noisy environments, however, voice data input may not be possible. Surrounding noise levels may mask the user voice inputs to such an extent that accurate recognition of the user's speech is not possible. In other circumstances, such as when verifying a user's identity, the user may opt for keypad entry or nonverbal interaction as well. Typically, user verification is performed using a username and a password. Because speaking such information into a multimodal interface can allow others to overhear confidential information, users often enter such information using GUIs or keypads. As noted, however, entering such information in this manner on a portable computing device can be cumbersome and tedious.

There are other disadvantages to using passwords. Typically, passwords are difficult to remember and are not very secure. Remembering passwords can be particularly difficult in light of the plethora of accounts held by users—each requiring a username and password. To avoid having to remember each password, users tend to use a common password for multiple accounts, write down passwords on the back of an access card, i.e. ATM card, or use a password that is the same as the user's username for the account. Any one of these behaviors can place the security of a user account in jeopardy.

Still, as functions such as banking, airline reservations, product purchasing, and the like, begin to migrate to multimodal Web-based interfaces, user verification will become increasingly important. Such systems can be successful only if the transactions are secure and if the systems ensure that the user is who the user claims to be. Accordingly, it would be beneficial to provide a technique for verifying users through a multimodal interface which overcomes the deficiencies described above.

SUMMARY OF THE INVENTION

The present invention provides a solution for verifying a user's identity over a communication network. One embodiment of the present invention can include a method of verifying a user identity using a multimodal Web-based interface. The method can include sending, to a remote client device, a multimodal markup language document that, when rendered by the remote client device, queries a user for a user identifier and causes audio of the user's voice to be sent to a multimodal, Web-based application. The user identifier and the recording can be received at about a same time from the client device. The audio can be compared with a voice print associated with the user identifier. Accordingly, the user at the remote client device can be selectively granted access to an online system according to a result obtained from the comparing step.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

The present invention provides a solution for verifying a user identity through the use of a multimodal Web-based interface. In accordance with the present invention, the identity of a user can be verified through the use of voice identification technology. A user can be presented with a multimodal document received from a multimodal Web-based application. The multimodal document, i.e. a Web page type of interface, can request that the user provide a user identifier or username (hereafter "user ID") and a voice sample. Both the user ID and voice sample can be provided back to the multimodal Web-based application. Voice verification can be performed upon the voice sample with reference to the user ID. Based upon the results of the voice verification, the user can be granted access to an online system or be denied entry.

Figure 1:
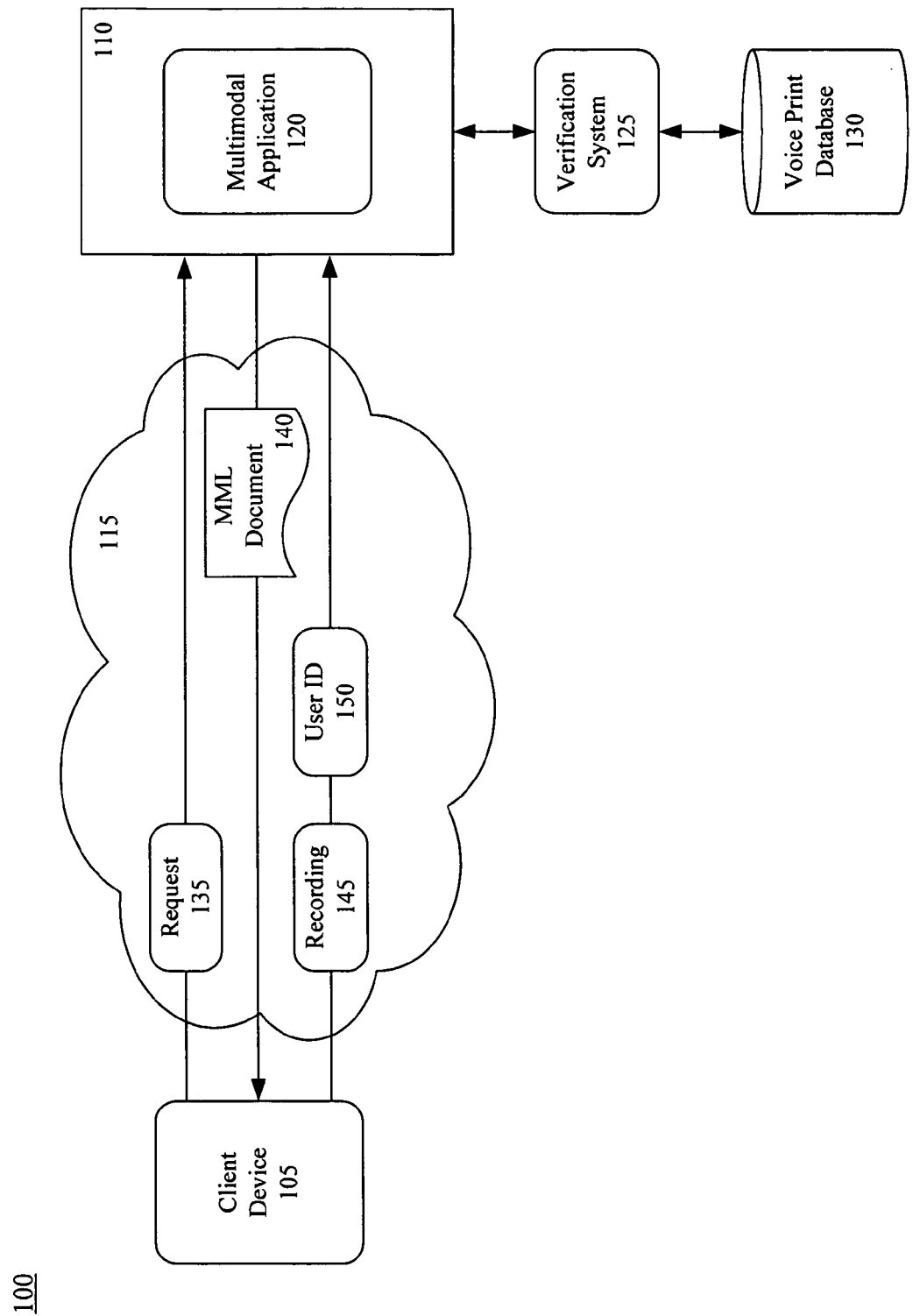
FIG. 1 is a schematic diagram illustrating a system for performing user verification using a multimodal Web-based interface in accordance with the inventive arrangements disclosed herein.

FIG. 1 is a schematic diagram illustrating a system 100 for performing user verification using a multimodal Web-based interface in accordance with the inventive arrangements disclosed herein. As shown, the system 100 can include a client device 105, a server 110 including a multimodal application 120, and a verification system 125 having a voice print database 130.

In one embodiment, the client device 105 can be any of a variety of computing devices such as a desktop computer, a server, or the like. In another embodiment, the client device 105 can be a portable and/or mobile computing device such as a laptop computer, a personal digital assistant (PDA) configured for Internet communications, whether wired or wireless, a mobile phone, or the like. In any case, the client device 105 can include suitable software for sending requests to, and receiving information from the server 110. For example, the client device 105 can include a suitable browser capable of rendering markup language documents, including multimodal markup language (MML) documents.

An MML document can specify visual and voice components for user interaction. Accordingly, an MML document can include any markup language based document, or file, that when rendered, allows a user to provide input through visual means such as a graphical user interface (GUI) and through audible means by speaking or providing dual tone multi-frequency inputs. One example of such a markup language is the X+V markup language. X+V is a proposed markup language for developing multimodal Web pages that combines Extensible Hypertext Markup Language (XHTML) and a subset of Voice Extensible Markup Language (VoiceXML).

XHTML, in general, is a version of HTML 4.0 that has been adjusted to comply with the rules of Extensible Markup Language (XML). VoiceXML is an XML-based language developed through the World Wide Web Consortium (W3C). VoiceXML provides a standardized format for building speech-based applications. Together, XHTML and VoiceXML (X+V) enable Web developers to add voice input and output to traditional, graphically-based Web pages.

Another example of MML is based on adding Speech Application Language Tags (SALT) to a host markup language such as XHTML, Hypertext Markup Language (HTML), or Scalable Vector Graphics (SVG). SALT is a proposed markup language that can be used to develop multimodal Web pages that support both visual and speech modes of user interaction. SALT is an XML-based language developed through the SALT Forum.

The server 110 can be any of a variety of information processing systems capable of fielding requests and serving information over a communications network, for example a Web server. As shown, the server 110 and the client device 105 can communicate over a communications network 115 such as the Internet, a local area network (LAN), a wide area network (WAN), a mobile or cellular network, another variety of communication network, or any combination thereof.

The multimodal application 120 can execute within the server 110. Accordingly, the multimodal application 120 can receive requests and information from the client device 105 and provide information, such as markup language documents, whether multimodal or not, in return. Though not shown, the multimodal application 120 can include, or access, audio processing services such as text-to-speech (TTS), speech recognition, and/or dual tone multi-frequency processing. These services can be located within the server 110 or can be located in a different computing system that is communicatively linked with the multimodal application 120.

The verification system 125 can verify user identities by comparing recordings of a user's voice with voice prints stored in the voice print database 130. The voice print database 130 can include a plurality of different voice prints from users that have enrolled in the verification system 125. Each voice print can correspond to, or be associated with, a user ID. When a voice recording is received, the verification system 125 can compare the voice recording with the voice prints in the voice print database 130 to determine whether a match exists.

In operation, the client device 105 can send a request 135 to the multimodal application 120 requesting an MML document. The multimodal application 120 can respond by sending MML document 140, i.e. a multimodal Web page. Upon rendering the MML document 140, the client device 105, under the direction of the MML document, can request a user ID and voice sample from the user. In one embodiment, the document can provide a script to be read by the user when providing the voice sample. Notably, any prompts can be audio prompts, whether recorded audio or TTS, or textual prompts displayed on a display screen of the client device 105.

The client device 105 can make a digital recording of the user's voice, for example as the user reads the script aloud. Once the user ID and a recording of the user's voice have been obtained by the client device 105, the client device 105 can send both to the multimodal application 120 under the direction of the MML document 140. The recording 145 and the user ID 150 can be sent at approximately the same time. Upon receiving the user ID 150 and recording 145, the multimodal application 120 can provide both to the verification system 125 for processing. The verification system 125 can locate a voice print in the voice print database 130 using the provided user ID 150. The verification system 125 then can compare the voice print with the recording 150 to determine whether the recording 150 matches the voice print. If so, the user can be granted access to an online system such as a Web site for banking, reservations, or the like. If not, access can be denied.

In another embodiment, audio need not be recorded in the client device 105, but rather streamed from the client device 105 over a data connection to the multimodal application 120. Mobile devices such as cell phones that support voice over data channel, known as Voice over IP (VoIP), can support the streaming of audio. In cases where the audio is streamed from the client device 105, the audio can be recorded by the multimodal application 120.

Figure 2:
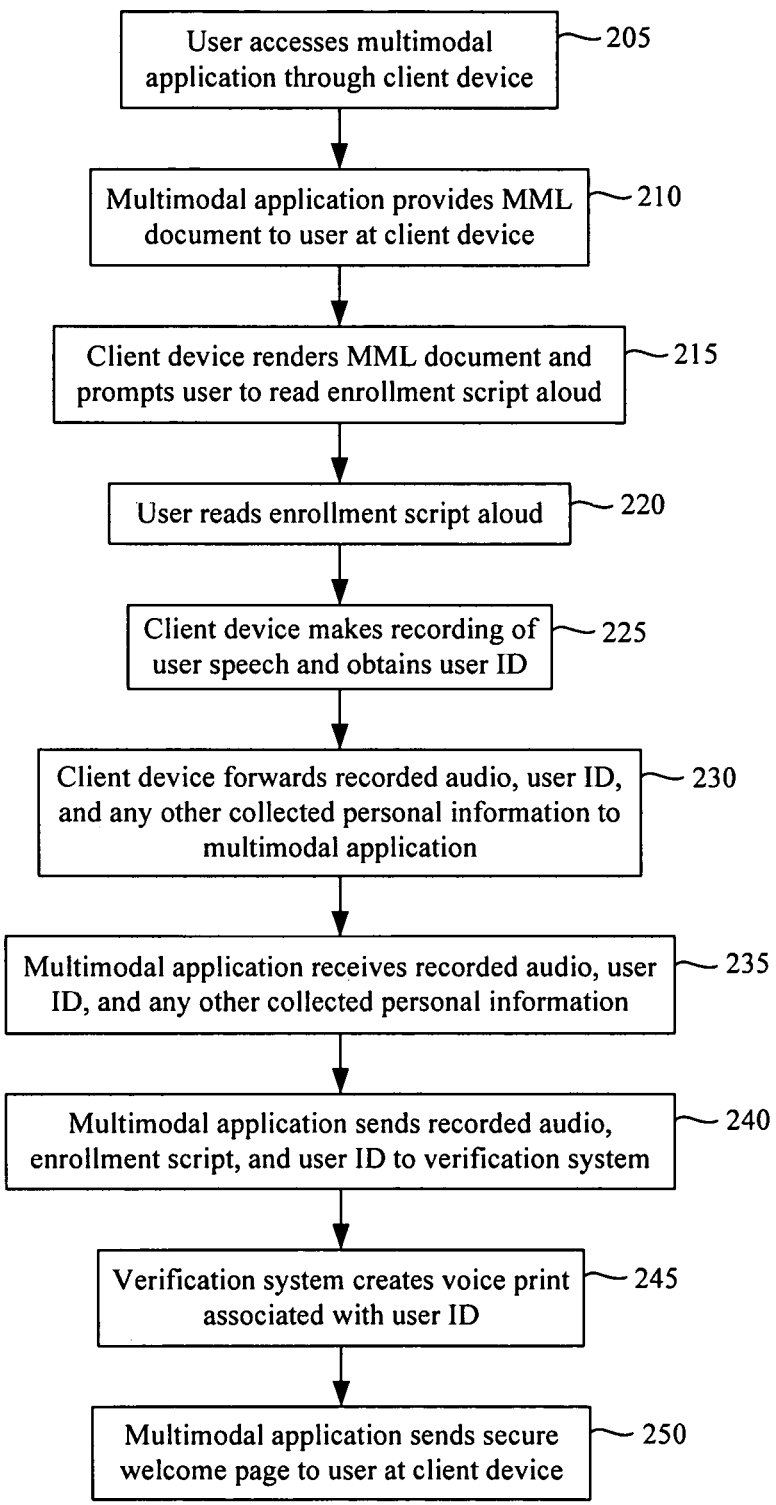
FIG. 2 is a flow chart illustrating a method of enrolling a user for purposes of user verification in accordance with the inventive arrangements disclosed herein.

FIG. 2 is a flow chart illustrating a method 200 for enrolling a user for purposes of user verification in accordance with the inventive arrangements disclosed herein. The method 200 can be performed by the system described with reference to FIG. 1, or another suitable system. The method 200 can begin in step 205, where a user that is new to an online system, can access a multimodal Web-based application. The user can access the multimodal Web-based application through a client device.

In step 210, the multimodal Web-based application can provide a secure MML document to the user at the client device. As noted, the MML document can specify a Web-based multimodal interface, or Web page. As such, it can specify fields for receiving a user ID as well as other personal information that may be necessary such as telephone numbers, addresses, electronic mail addresses, and the like. The MML document further can specify an enrollment script. The enrollment script can include text, numbers, symbols, letters, and the like.

In step 215, upon rendering the MML document, the client device can prompt the user to read the enrollment script aloud. The prompting can be text based, i.e. written instructions in the Web page, or can be an audible prompt, whether TTS or prerecorded audio. The enrollment script can be displayed as text upon the display screen of the client device. In step 220, the user can read the enrollment script aloud, i.e. speak the enrollment script. In step 225, the client device records the user reading the enrollment script aloud and obtains the user ID and any other personal information provided by the user. According to one embodiment of the present invention, a recording instruction within the MML document can instruct the client device to make a digital recording of the user speech. For example, within an MML document written in X+V, the record tag can be used.

In step 230, when the user has finished reading the enrollment script aloud, the client device can forward the recorded audio to the multimodal application executing on the server. In addition to the recorded audio, any information entered into the fields of the MML document, particularly the user ID, can be sent to the multimodal, Web-based application. It should be appreciated that the data obtained from the fields of the MML document and the recorded audio can be sent at the same time, or at approximately the same time. The client device forwards such information as specified by the MML document when executed.

As noted, in another embodiment, enrollment and/or verification audio can be streamed from the client device to the multimodal, Web-based application. In such an embodiment, the audio can be recorded by the multimodal, Web-based application. In that case, a streaming instruction within the MML document can instruct the client device to stream audio of the user speech to the multimodal, Web-based application.

In step 235, the multimodal, Web-based application can receive the audio as well as any other information entered into the MML document at the client device such as the user ID. In step 240, the multimodal, Web-based application sends the user ID, the audio, and the enrollment script to the verification system. In step 245, the verification system can create a unique voice print for the user from the audio and the text of the enrollment script. The resulting voice print can be associated with the user ID and stored within the voice print database. After successful enrollment of the user, in step 250, the multimodal, Web-based application can send a secure welcome page to the user and allow the user to access other secure pages within the server or another server.

Figure 3:
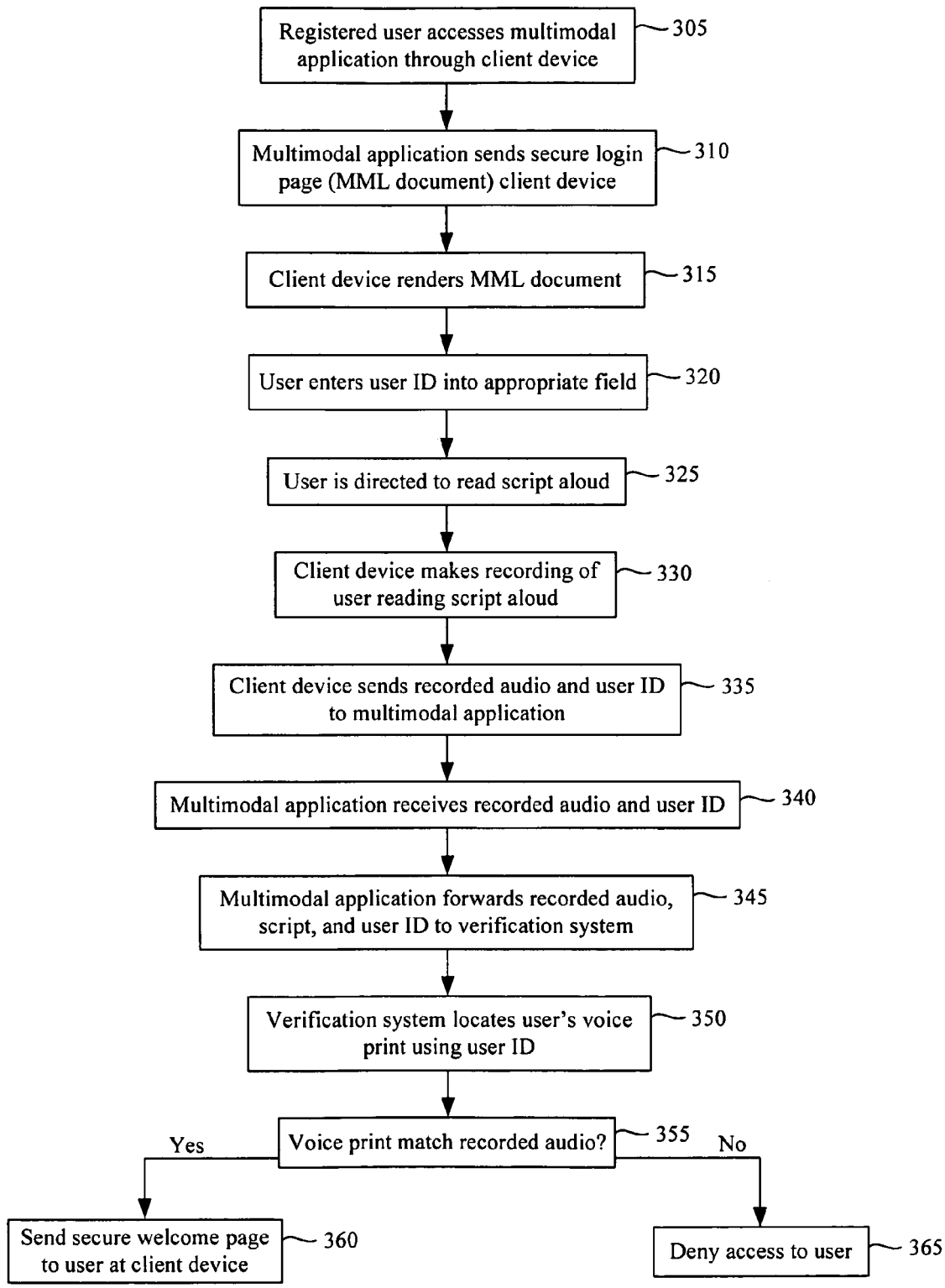
FIG. 3 is a flow chart illustrating a method of performing user verification in accordance with the inventive arrangements disclosed herein.

FIG. 3 is a flow chart illustrating a method 300 for performing user verification in accordance with the inventive arrangements disclosed herein. The method 300 can be performed using the system described with reference to FIG. 1 or another comparable system. In step 305, a registered user can access the multimodal, Web-based application via a client device to request a Web page or otherwise login to a system. In step 310, the multimodal application can send an MML document, in this case a secure Web-based login page, which can be rendered in step 315 by the client device.

The secure login page can specify one or more fields for receiving user input such as a user ID. The secure login page further can specify a script. The script can be a random sequence of letters, numbers, and/or words. The script can be randomly generated by the multimodal, Web-based application, for example by selecting words, letters, and/or numbers from a collection of such text. In one embodiment, the script can include any words, letters, or numbers randomly selected from the enrollment script.

The randomly generated script prevents imposters from trying to defraud the verification system. If an imposter attempts to play pre-recorded portions of a registered user's speech, the pre-recorded speech will not match the expected user speech to be used in voice print comparison. The prerecorded user speech will include different words than were specified in the randomly generated script. Accordingly, user verification will fail. Thus, according to one embodiment of the present invention, speech recognition can be used in addition to voice verification to prevent imposters from using prerecorded user speech to defraud the system.

In step 320, the user can enter his or her user ID into the appropriate field of the MML document now rendered on the display of the client device. The user can enter the user ID using speech, keypad entries, stylus entries, or the like. The particular manner in which the user enters the user ID is not intended to limit the present invention. In any case, the user ID can be stored in the client device temporarily.

In step 325, the user can be directed to read aloud the script presented upon the display of the client device. The user can be prompted through a TTS prompt, an audio prompt, or by textual instructions displayed in the rendered MML document. In step 330, the client device can make a digital recording of the user reading the script aloud. In one embodiment, the digital recording can be stored as PCM data. It should be appreciated, however, that the particular formatting of the digital audio file is not intended to limit the present invention as any of a variety of different digital audio formats can be used, such as ADPCM, MP3, AAC, or compressed DSR as may be used in the case where audio is streamed over a data connection to the multimodal, Web-based application.

In step 335, when the user is finished speaking, the client device can send the script and the user ID to the multimodal, Web-based application. The user ID and audio, i.e. verification audio, can be submitted from the client at approximately the same time and received by the multimodal, Web-based application at approximately the same time, whether as an entire recording or as streamed audio. In step 340, the multimodal, Web-based application can receive the audio and the user ID. In step 345, the multimodal, Web-based application can forward the audio, script, and user ID to the verification system.

In step 350, the verification system locates or retrieves the user's voice print from the voice print database using the user ID as a reference. In step 355, the verification system can compare the audio with the voice print matching the user ID to determine whether the audio matches the voice print. If so, the method can proceed to step 360 where a secure welcome page, which can be a conventional visual Web page or a multimodal Web page, can be provided from the multimodal, Web-based application to the user at the user device. The user, having been verified, can be allowed access to the site and other secure Web pages. If the recorded audio does not match the voice print, the user is denied access by the multimodal, Web-based application in step 365.

The present invention provides a solution for verifying the identity of a user using a Web-based multimodal interface. In accordance with the present invention, a speaker verification system verifies the identity of the speaker based on the physical characteristics of the speaker's voice. Through the multimodal interface, the user can both register and later be verified by the verification system. Enrollment is facilitated in that the enrollment script is presented to the user as visual text so the user need not have to remember a long passage of text.

The speaker verification portion requires the user to speak a random script, as provided by the multimodal application. The random script prevents imposters from trying to play pre-recorded portions of another user speaking in an attempt to defraud the verification system. The pre-recorded speech will not match the expected user speech as specified by the randomly generated script. The script used to verify the identity of a user, similar to the enrollment script, also can be presented visually. Verification using a multimodal interface can be more secure than using only one modality as both a visual password and speech verification can be required at the same time.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which, when loaded in a computer system, is able to carry out these methods. Computer program, software application, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of verifying a user identity using a multimodal, Web-based interface comprising:

receiving, from a remote computing device, a request for a multimodal markup language document for user authentication;

providing a script to be read aloud by a user;

sending, via a single data communication network connection to a remote computing device, a multimodal markup language document, comprising visual and voice components for use in user authentication and specifying the script, that, when rendered by the remote computing device, queries the user for a user identifier, displays the script within the remote computing device, and causes audio of the user's voice to be captured by the remote computing device and sent to a multimodal, Web-based application via the data communication network connection;

receiving, under control of the multimodal markup language document, at about a same time, from the remote computing device via the data communication network connection, the user identifier and the audio;

comparing the audio with a voice print and text of the script, wherein the voice print is associated with the user identifier; and selectively granting the user at the remote computing device access to an online system when the audio matches the voice print and the text of the script.

2. The method of claim 1, wherein the multimodal markup language document includes an instruction to stream the audio, said method further comprising, responsive to rendering the multimodal markup language document and interpreting the instruction to stream the audio, the remote computing device streaming the audio to the multimodal, Web-based application.

3. The method of claim 1, wherein the multimodal markup language document includes an instruction to record the audio, said method further comprising, responsive to rendering the multimodal markup language document and interpreting the record instruction, the remote computing device making a digital recording of the user's voice.

4. The method of claim 1, wherein the remote computing device is a mobile device.

5. The method of claim 4, wherein the multimodal markup language document is rendered by the remote computing device thereby generating a graphical user interface through which the user is queried and the script is displayed.

6. The method of claim 4, wherein the audio is a digital representation of the user reading the script aloud.

7. The method of claim 6, said comparing step further comprising the multimodal Web-based application first sending, to a verification system, the audio, the script, and the user identifier.

8. The method of claim 1, further comprising:

sending to the remote computing device a multimodal markup language document specifying an enrollment script;

receiving the user identifier and audio comprising a digital representation of the user speaking the enrollment script; and enrolling the user into an online system by determining a voice print from the audio of the user speaking the enrollment script and associating the voice print with the user identifier.

9. The method of claim 1, wherein the voice print is generated from the user reading enrollment text that is different from the text of the script.

10. The method of claim 1, wherein the script comprises, at least in part, randomly generated text.

11. A computer system for verifying a user identity using a multimodal, Web-based interface, the computer system comprising:

a computer configured with instructions that, when executed on the computer, perform a method comprising:

sending, via a single data communication network connection, to a remote computing device a multimodal markup language document, the multimodal markup language document comprising visual and voice components for use in user authentication and specifying a script to be read aloud by the user, wherein the multimodal markup language document, when rendered by the remote computing device, queries the user for a user identifier, displays the script within the remote computing device, and causes audio of the user's voice to be captured by the remote computing device and sent to the computer via the data communication network connection;

receiving, at about a same time from the remote computing device via the data communication network connection, the user identifier and the audio;

comparing the audio with a voice print and text of the script, wherein the voice print is associated with the user identifier; and selectively granting the user at the remote computing device access to an online system when the audio matches the voice print and the text of the script.

12. The system of claim 11, wherein the multimodal markup language document includes an instruction to stream the audio, and wherein the multi-modal markup language document, when rendered by the remote computing device, causes the remote computing device to interpret the instruction to stream the audio and to stream the audio to the computer.

13. The system of claim 11, wherein the multimodal markup language document includes an instruction to record the audio, and wherein the multi-modal markup language document, when rendered by the remote computing device, causes the remote computing device to interpret the record instruction and to make a digital recording of the user's voice.

14. The system of claim 11 in combination with the remote computing device, wherein the remote computing device is a mobile device.

15. The system of claim 11, wherein, when rendered by the remote computing device, the multimodal markup language document causes the remote computing device to generate a graphical user interface through which the user is queried and the script is displayed.

16. The method of claim 14, wherein the audio is a digital representation of the user reading the script aloud.

17. The system of claim 11, wherein the method further comprises:
- sending to the remote computing device a multimodal markup language document specifying an enrollment script;
- receiving the user identifier and audio comprising a digital representation of the user speaking the enrollment script; and
- enrolling the user into an online system by determining a voice print from the audio of the user speaking the enrollment script and associating the voice print with the user identifier.

18. Non-transitory machine readable storage, having instructions stored thereon that, when executed by a computer, cause the computer to perform a method of verifying a user identity using a multimodal, Web-based interface, the method comprising: sending, via a single data connection, to a remote computing device a multimodal markup language document, the multimodal markup language document comprising visual and voice components and specifying a script to be read aloud by the user, wherein the multimodal markup language document, when rendered by the remote computing device, queries the user for a user identifier, displays the script within the remote computing device, and causes audio of the user's voice to be captured by the remote computing device and sent to a multimodal, Web-based application via the data connection; receiving, at about a same time from the remote computing device via the data connection, the user identifier and the audio; comparing the audio with a voice print and text of the script, wherein the voice print is associated with the user identifier; and selectively granting the user at the remote computing device access to an online system when the audio matches the voice print and the text of the script.

19. The non-transitory machine readable storage of claim 18, wherein the multimodal markup language document includes an instruction to stream the audio, said method further comprising, responsive to rendering the multimodal markup language document and interpreting the instruction to stream the audio, the remote computing device streaming the audio to the multimodal, Web-based application.

20. The non-transitory machine readable storage of claim 18, wherein the multimodal markup language document includes an instruction to record the audio, said method further comprising, responsive to rendering the multimodal markup language document and interpreting the record instruction, the remote computing device making a digital recording of the user's voice.

21. The non-transitory machine readable storage of claim 18, wherein the multimodal markup language document is rendered by the remote computing device thereby generating a graphical user interface through which the user is queried and the script is displayed.

22. The non-transitory machine readable storage of claim 18, wherein the method further comprises: sending to the remote computing device a multimodal markup language document specifying an enrollment script; receiving the user identifier and audio comprising a digital representation of the user speaking the enrollment script; and enrolling the user into an online system by determining a voice print from the audio of the user speaking the enrollment script and associating the voice print with the user identifier.

* * * * *